United States Patent [19]
Opprecht

[11] 3,745,295
[45] July 10, 1973

[54] METHOD FOR AUTOMATIC MANUFACTURE OF METAL CONTAINER BODIES, AND WELDING MACHINE FOR APPLICATION THEREOF

[76] Inventor: Paul Jakob Opprecht, Im hinteren Bernold, 8953 Bergdietikon, Switzerland

[22] Filed: Jan. 27, 1971

[21] Appl. No.: 110,015

[30] Foreign Application Priority Data
Feb. 10, 1970 Switzerland.......................... 1868/70
Jan. 7, 1971 Switzerland........................... 172/71

[52] U.S. Cl. .................................... 219/64, 219/79
[51] Int. Cl. ............................................. B23k 1/16
[58] Field of Search ................... 219/59, 64, 67, 79, 219/80

[56] References Cited
UNITED STATES PATENTS
3,679,856  7/1972  Gruber................................. 219/59
2,023,897  12/1935  Neckerman............................ 219/59
1,808,261  6/1931  Sessions................................. 219/64
2,084,889  6/1937  Blevias.................................. 219/59

*Primary Examiner*—J. V. Truhe
*Assistant Examiner*—L. A. Schutzman
*Attorney*—Browdy & Neimark

[57] ABSTRACT

A method for automatic manufacture of metal container box utilizing a welding machine with electrode rolls by stacking and rounding the blanks and moving the round bodies on two conveying systems toward the welding point, the speed of the round body being reduced before reaching the welding point and the round body being transferred to the second conveying system for its feed to the welding point, the speed of the first conveying system being substantially greater than the speed of the second conveying system.

2 Claims, 7 Drawing Figures

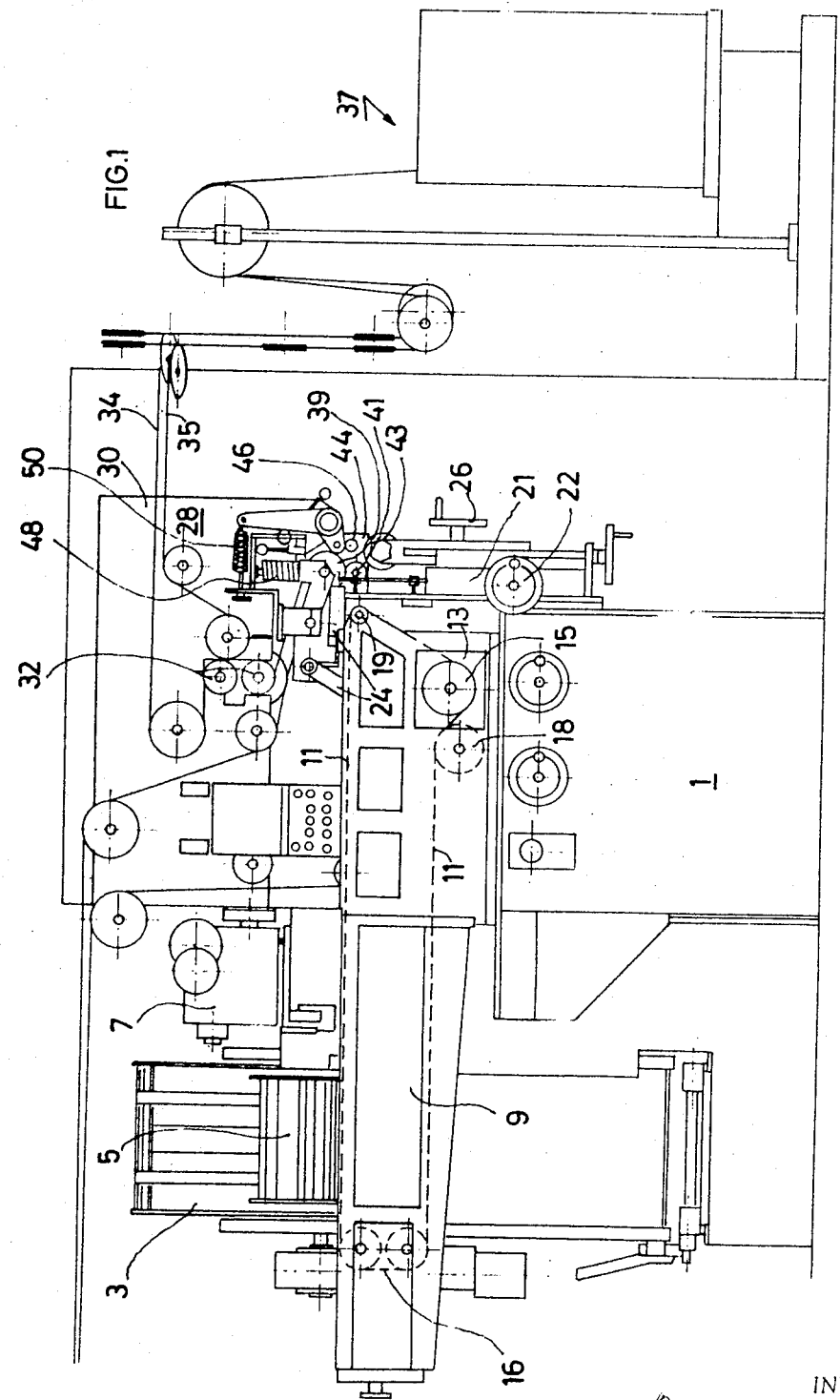

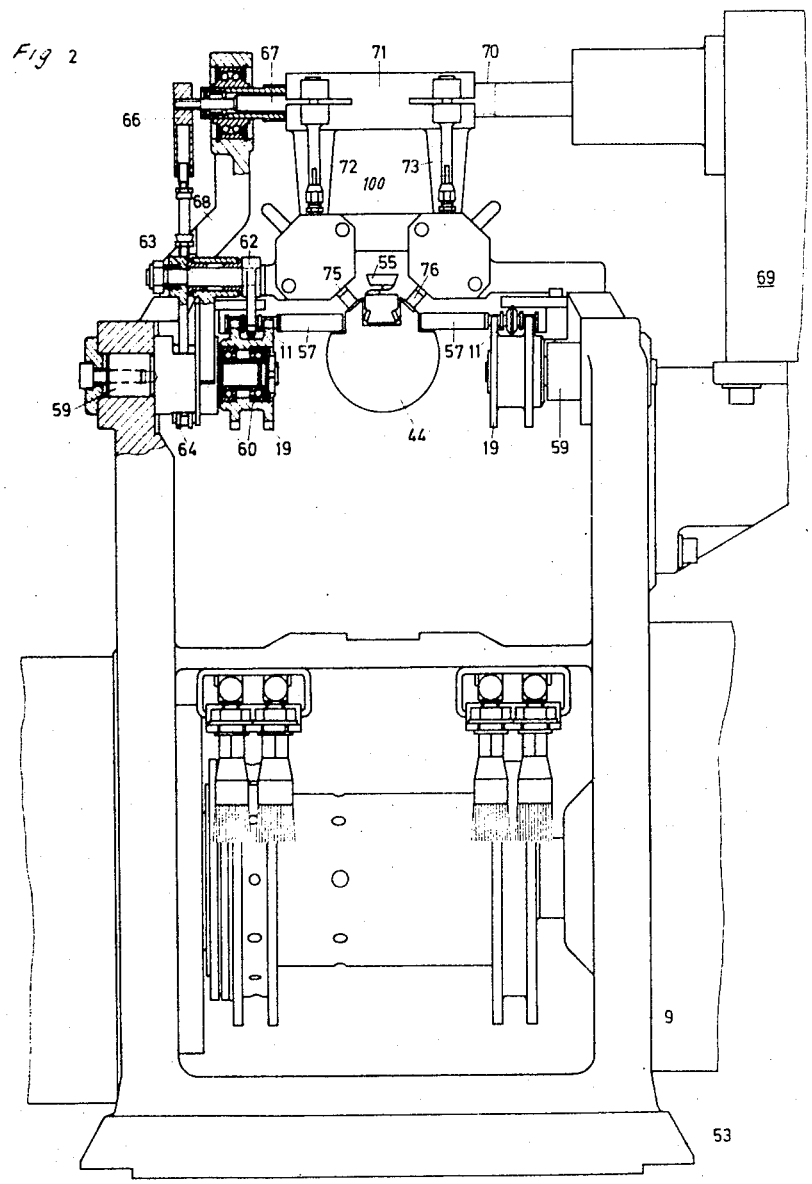

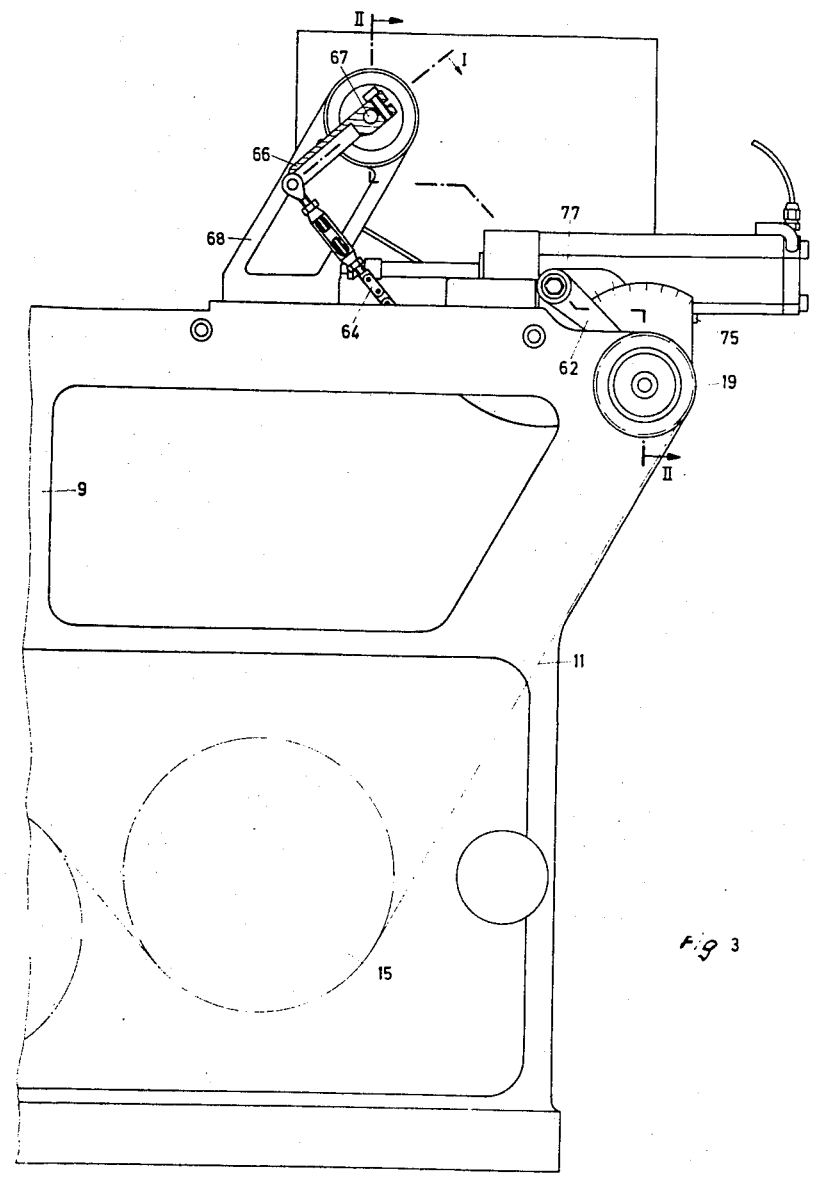

METHOD FOR AUTOMATIC MANUFACTURE OF METAL CONTAINER BODIES, AND WELDING MACHINE FOR APPLICATION THEREOF

The present invention concerns a method for the automatic manufacture of metal container bodies by a welding machine provided with electrode rolls, which method consists in stacking and rounding the blanks and moving them as round bodies by at least two conveying systems towards the welding point, and further concerns a welding machine for the application of such method.

Semi-automatic production of metal container bodies by welding is known, as is also the fully automatic production of soldered or folded metal bodies for the container industry.

The object of the present invention is to provide a fully automatic welding method characterized in that the speed of the round body is reduced before reaching the welding point, and that the round body, for its feed to the welding point, is transferred to the second, succeeding conveying system, the arrangement being such that the conveying speed of the first conveying system is substantially greater than that of the second conveying system, whose speed, at the moment of transfer of the round body to the electrode rolls, is at most equal to the welding speed.

The invention is now to be described by way of example with reference to the accompanying drawings, in which FIG. 1 is a general side view of a fully automatic machine for the welding of metal container bodies;

FIG. 2 is a front view of the front end of the welding machine shown in FIG. 1, partly in section, along line II—II in FIG. 3;

FIG. 3 shows a part of the front end of the welding machine viewed as in FIG. 1;

Figure 7:
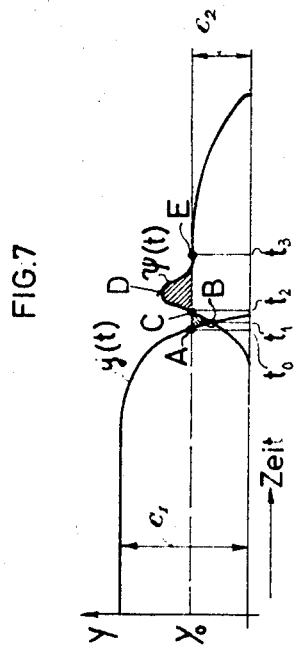
FIG. 7 is a speed-time diagram relating to the feed of the container bodies from the rounding point to the welding point.

The fully automatic machine for the welding of container bodies or metal frames shown in FIG. 1 is provided with a stacking unit 3 arranged on a machine frame 1. The stacking unit 3 serves to receive the rectangular metal blanks to be processed. Arranged at its output end is a so-called flexer, designed to equalize the internal stresses of the metal blanks fed. It has the form of a roller unit. Following the flexer is a rounding machine 5, which shapes the stress-free blanks into cylinders. Stacking unit 3, flexer and rounding machine 5 are driven by a drive group 7. On the front of the welding machine is a horizontally movable feed support 9 comprising skids not shown) for the guidance of the metal bodies rounded in the rounding machine 5. The support 9 further supports a conveying chain system 11 comprising two endless conveying chains arranged side by side and running parallel. These conveying chains 11 can be changed according to the particular length of container. Each pair of chains is calculated for a specific graded working range, as for container lengths of 80 to 130 mm, etc. The chains 11 are driven through a clutch 13 having a chain synchronizer, and a sprocket 15. The arrangement further comprises a chain-tensioning carriage 16 and guide sprockets 18 and 19.

The feed support 9 can be brought into the position required by an adjusting means 21 operated by a handwheel 22. The support 9 further supports in movable manner an insertion means 24, which is synchronized with the chain movement in a manner subsequently described. A handwheel 26 is provided to drive the insertion means for the purpose of setting and adjusting the frame conveying means.

Shown on the right side of FIG. 1 is a welding system 28 of basically known type, whose bearing plate 30 serves to support the entire electrode wire drive 32 for an upper and a lower electrode wire 35 and 34.

Beside the actual welding machine are two so-called container coilers; only one, 37, is shown. The coilers serve to receive the electrode wires used.

The welding system 28 further comprises two electrode rolls 39 and 41, which guide the electrode wires 34 and 35 and which serve the power supply. A so-called Z-bar 55 is attached to the machine frame by its extended end. The welding arm 44 secured to the bearing plate 30 is attached to the Z-bar 55, as by screws. Following the electrode rolls 39 and 41 are guide rolls 43 and squeeze rolls 46, which finish the weld.

Figure 4:
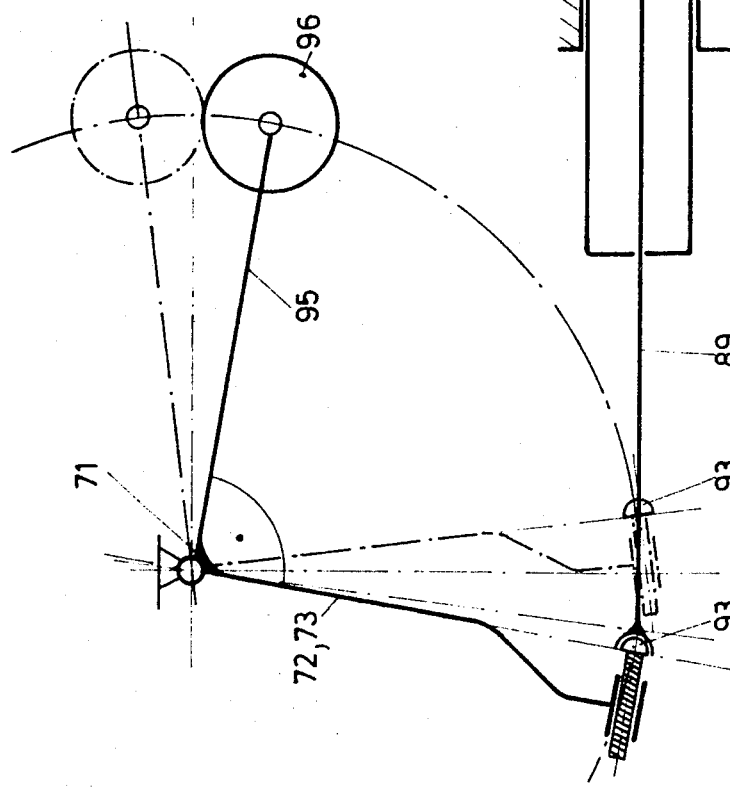
FIG. 4 shows the insertion mechanism for the synchronized insertion of the container bodies between the wire electrodes.
Figure 5:
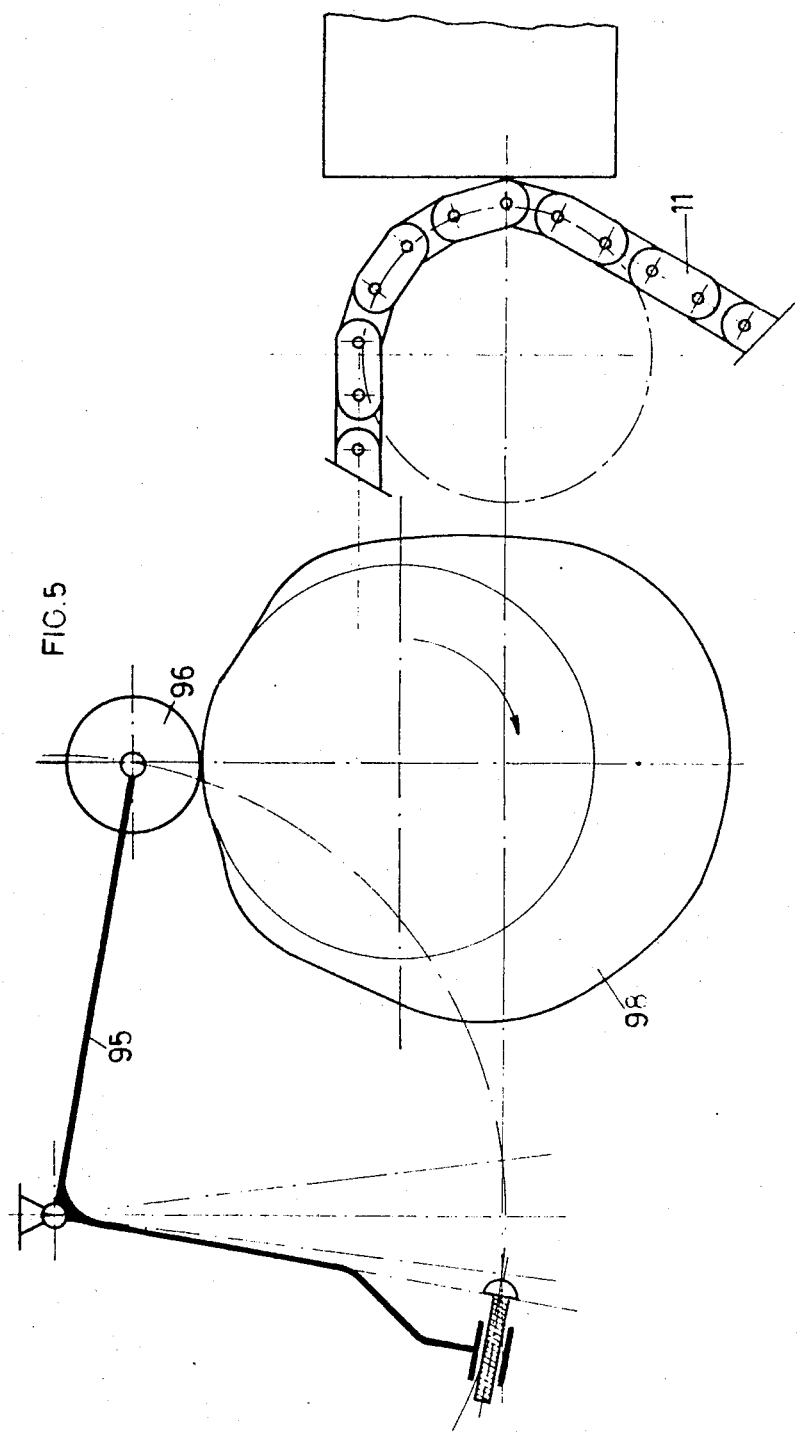
FIG. 5 shows the drive of the insertion mechanism according to FIG. 4.
Figure 6:
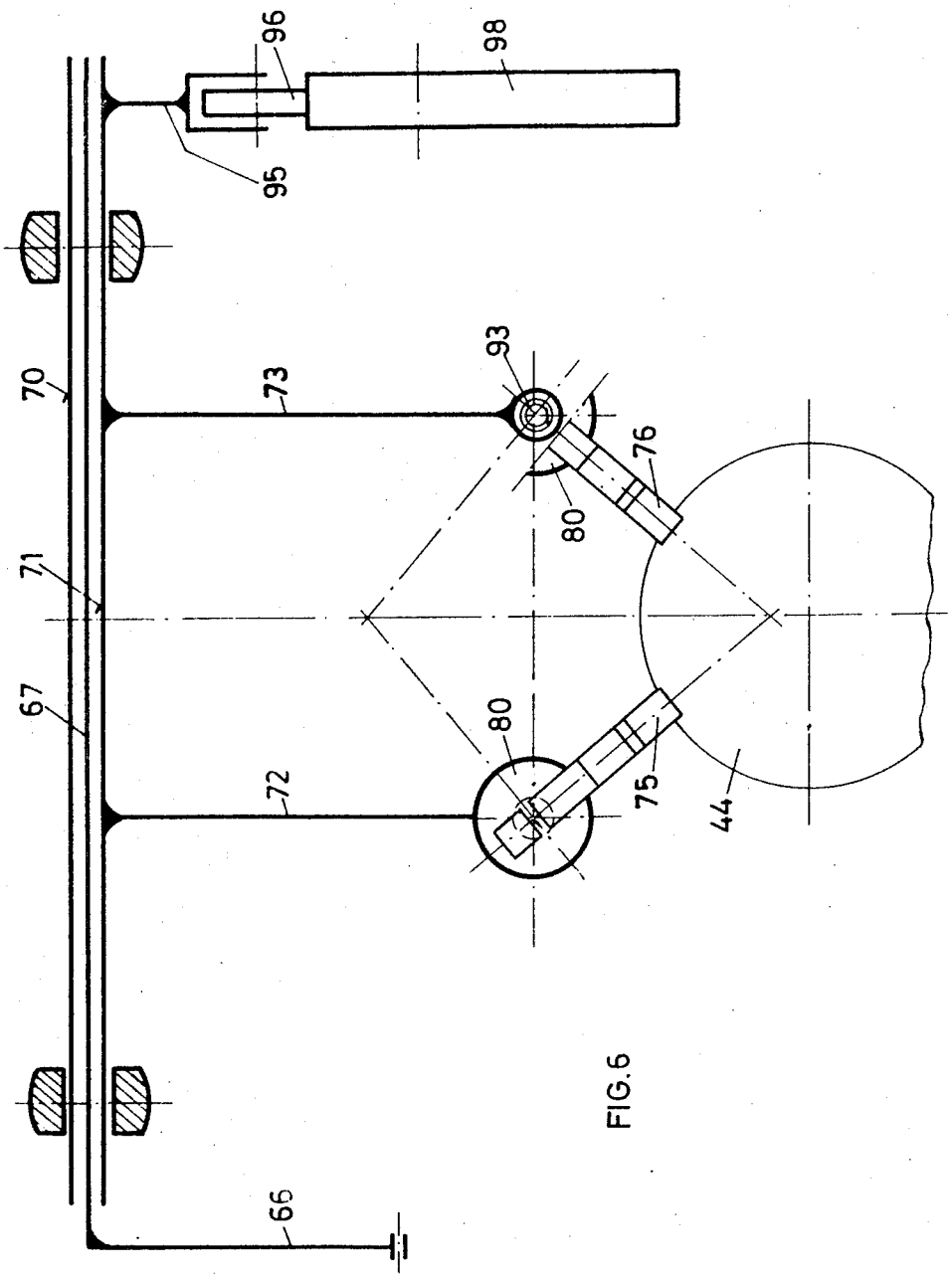
FIG. 6 shows the pawl control means.

FIG. 1 further shows two springs 48 and 50 serving to produce the welding pressure or the pressure on the squeeze rolls 46. The movable feed support 9 presents a dovetail guideway 53, as shown in FIG. 2. Arranged in its top portion are the welding arm 44 and the Z-bar 55. The fingers 57 of the chains 11 run in the recesses on both sides of the arm 44. The guide rolls 19 for the chains 11 are mounted in ball bearings 60 on pins 59. A control lever 62 operated by dogs of the chain 11 acts through a short pin 63 on to a chain pull 64 (see also FIG. 3), which is connected to a rocker 66. The rocker 66, which is adjustable on a control shaft 67 with respect to its angular position, transmits the movement of the control lever 62 to the said control shaft 67. This is mounted in a support 68. It leads to a control unit 69, whose design is not part of the invention and is therefore not described in detail. In that control unit 69, the control shaft 67 acts on a cam 98, which, acting through a cam roll 96 and a rocking lever 95 (FIGS. 4–6), actuates a hollow shaft 70 and, seated thereon, a rocking lever 71 with a double rocker 72 and 73. Fitted to the free end of each of the rockers 72 and 73 is a ball joint 93 with a thrust rod 89, whose end is provided with yet another ball joint 91. The pan of the latter forms part of a tappet 80, which also supports a pin 81 for the pivoting of insertion pawls 75 and 76. The tappet 80 is slidably arranged in a cylindrical case 77 and connected to an insertion plunger 78. The plunger rod 85, which is slidably arranged in the tappet 80, supports a cam roll 83, which continually rests against the cam path 84 of the pawls 75 and 76 respectively. The fully automatic welding machine described functions as follows: A conveying system, which may be pneumatic, for instance, and which is not further described, conveys the blanks from the stacking unit 3 to the flexer and subsequently to the rounding machine 5. After the rounding process, the metal body is gripped by two fingers 57 of the chains 11 and moved at constant speed over the skids (not shown) towards the welding point. In the process, the container body edges to be welded up are guided accordingly in the Z-bar 55. To ensure continuous operation of the rounding machine 5 and also the continuous supply of container bodies to the welding point, the first conveying system, comprising the chains 11, must move at a substantially greater speed $C_1$, such as double the welding speed $C_2$, than the second conveying system (FIG. 7). Only thus is it possible for the rounding process in the chains 11 to proceed during the advance thereof without obstruction. Now, in order to ensure the feed of the metal frame to be welded up or the feed of the metal body to the welding point, its speed $C_1$ must be reduced to such a degree that the metal body, when running in between the electrode rolls 39 and 41 or the wire electrodes 34 and 35, moves at the speed $C_2$ of the wire electrodes 34 and 35. The insertion between the wire electrodes is effected by a push-conveying system. This system, which comprises the pawls 75 and 76, is controlled for synchronism by the chains 11 of the first conveying system by means of the control lever 62. Parts of the fingers 57 of the chain 11 swing out the control lever 62 in accordance with their intervals and, acting through the pin 63, give a corresponding twist to the chain pull 64 and the rocker 66 of the control shaft 67. This twist of the shaft 67, transmitted through a clutch, gives a twist to a cam 98 which, acting by the cam roll 96, moves the rocking lever 95. The movement of the latter causes the rocking lever 71 with the double rockers 72 and 73 to pivot to such a degree that in the first phase of the movement the pawls 75 and 76 perform an approach movement, i.e., a swing towards the path of the container body, as indicated by the broken line in FIG. 4. In the welding phase, the pawls 75 and 76 move, according to the path of the cam 98, towards the electrode rolls 39 and 41 (translational movement), during which the container body gripped at the end of the first movement is pushed to the welding point. These movements of the first and second conveying systems are synchronized by means of the fingers 57 and the control lever 62 in conjunction with the cam 98. The pawls 75 and 76 grip the container body in the zone of the frame edges to be welded up for the purpose of holding it in the correct position. After the welding performed in the rolling zone of the wire electrodes 34 and 35, the weld is worked over by the squeeze rolls 46. The rolls 46 also aid the transfer of the welded container body from the welding point. The limiting conditions for the development of the container body speed are, first, the conveying speed in the first stage after transfer from the rounding machine 5, viz. $y = y(t)$ for $t = 0$, and, secondly, the ultimate speed psi $=$ psi $(t)$ for $t = t_3$ of the container body, which must correspond exactly to the welding speed $C_2$ or the speed of the wire electrodes at the welding point. A transfer zone for the container body from the first conveying system to the second one would in theory have to be so designed that the container body would not undergo any acceleration (for $t = t_0$), but would instead undergo a deceleration as uniform as possible from the double or multiple $C_1$ to the simple welding speed $C_2$. This condition of acceleration-free transfer is not economically feasible in practice, in particular because of the tolerances of the conveying chains and the container body. When the container body is taken over by the pawls 75 and 76 ($t = t_1$), the feed speed of the container body is lower than the welding speed, viz. psi $(t_1)$ < psi $(t_3)$, so that, in the first phase of the feed movement, the container body must be accelerated by the pawls 75 and 76 beyond the welding speed, viz. $t_2 < t < t_3$, so that the way lost at the end of the first conveying system can be made good in the second. This may be seen from the particular curves in FIG. 7. Accordingly, (Surface ABC) approximately equals (Surface CDE).

When the chains 11 run round the guide sprockets, the component of the chain speed $C_1$ diminishes in the direction of movement of the container bodies according to the law $C_1 \cdot \cos$ phi, in which process phi varies from 90° through 0 to −90°, while $C_1$ varies through 0 to −$C_1$. At Point B (FIG. 7) for phi approximately equal to 60°, the container body is transferred to the pawls 75 and 76. Then the pawls 75 and 76 with the container body are accelerated to the speed according to Point D and subsequently decelerated to the welding speed $C_2$ (Point E). From that moment, the conveying speed briefly remains constant and then diminishes in the manner of a trajectory parabola ($C_2$).

The electrode wires used are preferably wires flattened from round wires, as by rolling, with flat bottom and top surfaces and rounded sides.

I claim:

1. A method for the fully automatic manufacture of metal container bodies from metal blanks by a welding machine provided with electrode rolls, comprising the steps of:

stacking and rounding the blanks;

moving the rounded blanks by a first conveying system toward the welding point;

transferring the rounded blanks directly from said first conveying system to a second conveying system, the speed of said second conveying system being substantially less than the speed of said first conveying system; and moving the rounded blanks to the electrode rolls on said second conveying system at a speed substantially equal to and at most the speed of the electrode rolls, reducing the speed of the rounded blank on said first conveying system below the speed of said electrode rolls immediately before said transferring step and increasing of the rounded blank on said second conveying system above the speed of said electrode rolls immediately after said transferring step, so as to compensate for said speed reduction before said transferring step, and thereafter reducing the speed of the rounded blank to a speed substantially equal to and at most the speed of said electrode rolls.

2. A method according to claim 1, wherein the speed of said first conveying system is at least approximately double the speed of the electrode rolls.

* * * * *

UNITED STATES PATENT OFFICE
CERTIFICATE OF CORRECTION

Patent No. 3,745,295     Dated July 10, 1973

Inventor(s) Paul Jakob Opprecht

It is certified that error appears in the above-identified patent and that said Letters Patent are hereby corrected as shown below:

In claim 1, line 20, "increasing" should read: --increasing the speed--.

Signed and Sealed this

Thirteenth Day of July 1982

[SEAL]

Attest:

Attesting Officer

GERALD J. MOSSINGHOFF

Commissioner of Patents and Trademarks